(12) United States Patent
Van Hoeken

(10) Patent No.: US 11,332,223 B2
(45) Date of Patent: May 17, 2022

(54) ARRAY OF PONTOONS FOR SOLAR PANEL AND CONNECTION MODULES THEREFOR

(71) Applicant: Oceans of Energy B.V., Katwijk (NL)

(72) Inventor: Allard Pieter Van Hoeken, Katwijk (NL)

(73) Assignee: OCEANS OF ENERGY B.V., Katwijk (NL)

( * ) Notice: Subject to any disclaimer, the term of this patent is extended or adjusted under 35 U.S.C. 154(b) by 0 days.

(21) Appl. No.: 16/766,184

(22) PCT Filed: Nov. 22, 2018

(86) PCT No.: PCT/NL2018/050786
§ 371 (c)(1),
(2) Date: May 21, 2020

(87) PCT Pub. No.: WO2019/103609
PCT Pub. Date: May 31, 2019

(65) Prior Publication Data
US 2020/0361578 A1  Nov. 19, 2020

(30) Foreign Application Priority Data

Nov. 22, 2017  (NL) .................................. 2019956

(51) Int. Cl.
| B63B 35/44 | (2006.01) |
| H02S 20/30 | (2014.01) |
| B63B 39/00 | (2006.01) |
| H01R 35/02 | (2006.01) |
| H01R 35/04 | (2006.01) |

(52) U.S. Cl.
CPC .............. *B63B 35/44* (2013.01); *B63B 39/00* (2013.01); *H01R 35/02* (2013.01); *H01R 35/04* (2013.01);
(Continued)

(58) Field of Classification Search
CPC . B63B 35/44; B63B 39/00; B63B 2035/4453; H02S 20/30; H01R 35/02; H01R 35/04
See application file for complete search history.

(56) References Cited

U.S. PATENT DOCUMENTS 3,974,789 A * 8/1976 de Groot ................. B63B 21/50
114/256
6,196,151 B1 * 3/2001 Grant ..................... B63B 27/143
114/261
(Continued)

FOREIGN PATENT DOCUMENTS

AU  2016100759 A4  6/2016

OTHER PUBLICATIONS

International Search Report dated Mar. 14, 2019 issued in corresponding International Application No. PCT/NL2018/050786 (2 pgs.).
(Continued)

*Primary Examiner* — S. Joseph Morano
*Assistant Examiner* — Jovon E Hayes
(74) *Attorney, Agent, or Firm* — Pillsbury Winthrop Shaw Pittman, LLP

(57) ABSTRACT

Waves introduce stresses in a floating object, such as a pontoon. The stresses can be introduced by multiple mechanisms, such as waves crashing onto the pontoon, an imbalance in buoyancy and weight load causing hogging and sagging Alternating movements and stresses may result in fatigue in the material. Multiple pontoons can be moored next to each other. When placed on a body of water with a higher wave intensity, such as open sea, the wave induced motions and stresses may cause failures in the pontoons or connections between individual pontoons. A network of pontoons is provided, interconnected with connection modules. The connection modules allow the network of pontoons to resist the loads and movements from the waves or to
(Continued)

follow the shape of the, thus preventing failures in the connection modules and in the pontoons. The pontoons may be used to provide a mounting surface for photovoltaic panels.

20 Claims, 7 Drawing Sheets

(52) U.S. Cl.
CPC ...... *H02S 20/30* (2014.12); *B63B 2035/4453* (2013.01)

(56) References Cited

U.S. PATENT DOCUMENTS

| | | | | |
|---|---|---|---|---|
| 8,176,868 B2* | 5/2012 | Han | .................. | B63B 35/38 114/267 |
| 9,184,693 B2* | 11/2015 | Yun | .................. | B63B 35/44 |
| 9,932,095 B2* | 4/2018 | Bergstrom | .............. | B63B 35/38 |
| 10,266,236 B2* | 4/2019 | Yamashita | .............. | H02S 20/00 |
| 10,396,703 B2* | 8/2019 | Niimi | ...................... | B63B 35/38 |
| 10,411,643 B2* | 9/2019 | Smadja | ................. | F24S 30/422 |
| 10,644,645 B2* | 5/2020 | Bjorneklett | .............. | H02S 20/30 |
| 2012/0305051 A1* | 12/2012 | Kokotov | ................. | F24S 20/70 136/246 |
| 2013/0146127 A1* | 6/2013 | Lunoe | .................... | B63B 35/44 136/251 |
| 2017/0349245 A1* | 12/2017 | Yamashita | ............ | F24S 25/636 |
| 2020/0361578 A1* | 11/2020 | Van Hoeken | ........... | B63B 35/44 |

OTHER PUBLICATIONS

Written Opinion of the International Searching Authority dated Mar. 14, 2019 issued in corresponding International Application No. PCT/NL2018/050786 (6 pgs.).

* cited by examiner

ARRAY OF PONTOONS FOR SOLAR PANEL AND CONNECTION MODULES THEREFOR

CROSS-REFERENCE TO RELATED APPLICATIONS

This application is the U.S. National Stage of PCT/NL2018/050786, filed Nov. 22, 2018, which claims priority to: Netherlands Patent Application No. 2019956, filed Nov. 22, 2017, the entire contents of both of which are herein incorporated by reference in their entireties.

TECHNICAL FIELD

The various aspects and embodiment thereof relate to a pontoon and a connection module for connecting pontoons. The pontoons are provided as platforms for, for example, photovoltaic panels, aquaculture, or any other application that requires a platform on a body of water.

BACKGROUND

Providing photovoltaic panels on pontoons floating on a water body is done on inland waters. Floating bodies or pontoons are interconnected and organised in large arrays. They are interconnected by means of lines like steel wires or synthetic lines, or by rigid members, comprising materials like High Density PolyEthylene (HDPE) or steel. The connections are also provided using pontoons comprising protruding openings, which can be connected by providing a pin through two overlapping openings of two adjacent pontoons.

Such connections may work well in areas where there are small waves. However, in areas with higher waves, like an open sea, the connections do not have enough strength or flexibility, resulting in connections failing due to high stresses or fatigue or resulting in pontoons to bump into one another.

SUMMARY

Waves introduce stresses in a floating object, such as a pontoon. The stresses can be introduced by multiple mechanisms, such as waves crashing onto the pontoon, and an imbalance in buoyancy and weight load causing hogging and sagging. Alternating movements and stresses may also result in fatigue in the material. To cover a large area, multiple pontoons may be moored next to each other conventionally "side by side". Such a configuration may function properly when placed on a still body of water. However, when placed on a body of water with a higher wave intensity, such as open sea, the wave induced motions and stresses cause failures in the pontoons or connections between individual pontoons. It is preferred to provide a network of pontoons, interconnected with connection modules, that can be placed on open sea. The connection modules allow the network of pontoons to resist the loads and movements from the waves or to follow the shape of the waves better than existing connection modules, thus preventing failures in the connection modules and in the pontoons. The pontoons may be used to provide a mounting surface for photovoltaic panels.

On inland waters, environmental conditions are relatively stable. This applies in particular to waves—compared to open sea, inland water waves are relatively limited in height and in contained energy. Even in case of strong winds, the dynamics of waves on inland waters are negligible compared to wave dynamics on open sea. Furthermore, the saline water of a sea introduces additional challenges in the material choice for pontoons compared to the sweet water of inland waters such as lakes.

It is preferred to provide a working platform or multiple working platforms for multiple applications, including, but not limited to carrying photovoltaic panels, which can be conveniently used at sea and which is arranged to provide at least some flexibility in connections between the working platforms to accommodate forces applied by waves to the working platform.

A first aspect provides a connection module, arranged for connecting multiple pontoon modules. The connection module comprises at a first end, a first coupling module, arranged to connect the connection module at a first end to a receiving module of a first pontoon module, at a second end, a second coupling module, arranged to couple the connection module at a second end with a receiving module of a second pontoon module and a connecting element, provided between the first end and the send end of the connection module. In this connection module, the connecting element is arranged to provide a connection between the first pontoon module and the second pontoon module. Furthermore, the connecting element is arranged with at least one of the following specifics: change in length under the influence of an external force on the connection module and/or allow a rotation under the influence of an external torque and/or bending moment between the first coupling module and the second coupling module.

In an embodiment, the connecting element comprises a substantially resilient material, arranged to at least one of change in length under the influence of an external force on the connection module and/or allow a rotation under the influence of an external torque and/or bending moment between the first coupling module and the second coupling module.

In a further embodiment, the connecting element comprises a substantially rigid material, arranged to provide at least one of a minimal distance and a minimal angle between two connected pontoon modules.

In yet another embodiment, the connecting element comprises alternately rigid and resilient elements. Such an embodiment allows the multiple resilient elements to hinge relative to adjacent resilient elements by locally compressing and straining the resilient element provided in-between the adjacent resilient elements. Rotation between the adjacent resilient elements is allowed by local shear within the resilient element provided in-between the adjacent resilient elements. Translation between adjacent resilient elements is allowed by globally compressing or straining the resilient element provided in-between the adjacent resilient elements. Such a construction resembles the working of a spine. The sum of all translation and rotation between the rigid elements allows a relatively large translation and rotation between two connected pontoon modules, with only relatively small translations and rotations, and thus relatively small stresses, within the connecting element.

A second aspect provides a pontoon module, arranged to provide a floating working surface. The pontoon module comprises a floating body, arranged to float on a water body; and a receiving module, arranged to receive a coupling module of a connection module according to the previous aspect. The receiving module may be provided at a bottom side of the floating body, or alternatively in a hollow space comprised by the floating module.

A third aspect provides a network of pontoon modules, comprising a first pontoon module according to the second aspect, a second pontoon module according to the second aspect, provided adjacently to the first pontoon module and a first connection module according to the first aspect, wherein a first coupling module is connected to a receiving module of the first pontoon module, and a second coupling module is connected to a receiving module of the second pontoon module.

When using the pontoon modules for providing a mounting surface for photovoltaic panels, the connection modules may be arranged to transport electrical energy in the network of pontoon modules. Furthermore, the network of pontoon modules may be provided with an electrical connection to a grid on land, and a battery for storing the electrical energy collected by the photovoltaic panels. Such a battery may comprise multiple battery units provided in one or more of the pontoon modules, or the network of pontoon modules may be provided with one or more pontoon modules which are specifically arranged for storing electrical energy.

DETAILED DESCRIPTION

Figure 1A:
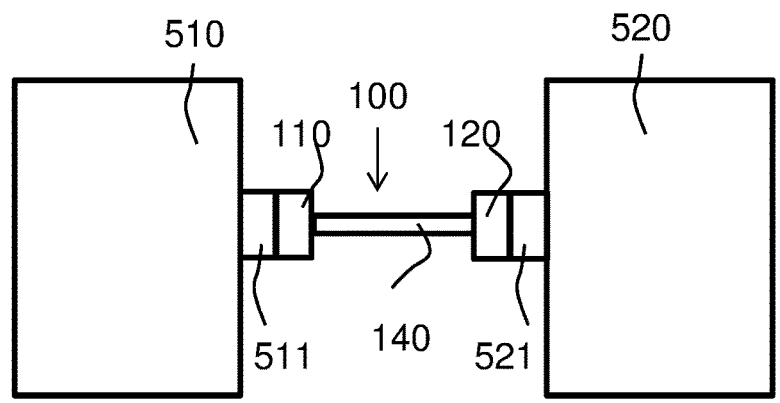
FIG. 1A: shows a connection module provided between two pontoon modules

FIG. 1A shows a connection module 100, arranged for connecting multiple pontoon modules to each other. The connection module 100 comprises at a first end a first coupling module 110, and at a second end, opposite of the first end, a second coupling module 120. The first coupling module 110 is arranged to connect the connection module 100 at the first end to a receiving module 511 of a first pontoon module 510. Likewise, the second coupling module 120 is arranged to connect the connection module 100 at the second end to a receiving module 521 of a second pontoon module 520. Provided in-between the first coupling module 110 and the second coupling module 120 is a connecting element 140.

The connecting element 140 is arranged to provide a connection between the first pontoon module 510 and the second pontoon module 520. As this connection might be subjected to at least one of an external load, an external bending moment and an external torque, the connecting element 140 is arranged to change length under said external load, to allow a rotation between the first pontoon module 510 and the second pontoon module 520 under said external torque, and to allow bending between the first pontoon module 510 and the second pontoon module 520 under said bending moment.

In a further embodiment multiple connection modules 100 are provided between the first pontoon module 510 and the second pontoon module 520.

The coupling between the coupling modules and the receiving modules may be arranged as a pin corresponding to a socket provided at the receiving modules, as a hook and a loop for receiving the hook, as flanges, clamps, as a magnetic coupling, or as any other coupling or any combination thereof.

Figure 1B:
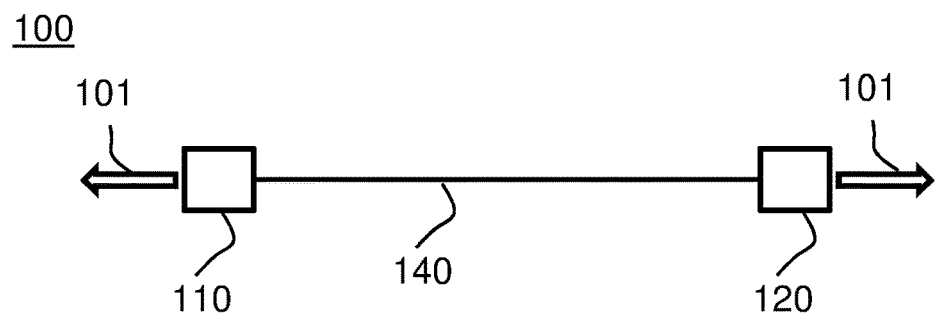
FIG. 1B: shows the connection module exposed to an external force

FIG. 1B shows the connection module 100 under an external load 101, which is directed outward and arranged to increase the distance between the first coupling module 110 and the second coupling module 120 and thus introduce a strain in the connecting element 140. Alternatively, the external load 101 is directed inward and results in a compressive force on the connecting element 140 that may result in a decrease of the distance between the first coupling module 110 and the second coupling module 120 and thus introduce a compression in the connecting element 140.

To cope with this strain or compression without seeing plastic deformation in the connecting element 140, or to allow limited of such deformation, in an embodiment of the connection module 100, the connecting element 140 comprises a substantially resilient material. The resilient material is arranged such that under a certain pre-determined external load, the resilient material will behave substantially elastically and no, or limited, plastic deformation will occur. To exhibit such elastic behaviour, the connecting element may comprise an elastomer such as natural or synthetic rubber or a combination thereof. Alternatively or additionally, components comprising polyolefins, other polymers, either organic or inorganic, or others plastics may be used as well. In another embodiment of the connection module 100, the connecting element 140 comprises a substantially rigid material.

To prevent two connected pontoon modules from colliding if the connecting element 140 is compressed, a minimal safe distance length can be pre-determined. In one embodiment, if the length of the connecting element 140 reaches this minimal safe distance length, the connecting element 140 is arranged to behave substantially rigid to compression.

Likewise, a maximal distance length for the connecting element 140 can be predetermined, wherein, in the same or another embodiment, after the connecting element 140 has reached the maximal distance length, the connecting element 140 behaves substantially rigid to prevent further elongation. This maximal distance length can also be constrained by providing one or more additional connection elements, e.g. ropes and lines, that have a predetermined length. A too high maximal distance between the pontoon modules might cause entanglement of the connection modules, for which reason the length of the connecting element is preferably limited.

Figure 1C:
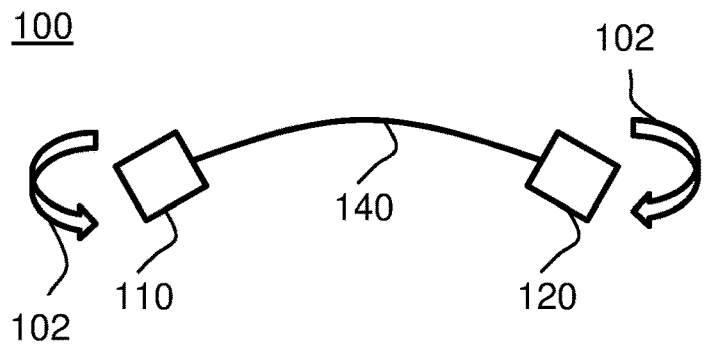
FIG. 1C: shows the connection module exposed to an external moment

FIG. 1C shows the connection module 100 under an external moment 102, in either a top view or a side view. Under the external moment 102, the connecting element 140 is arranged to bend substantially elastically.

Figure 1D:
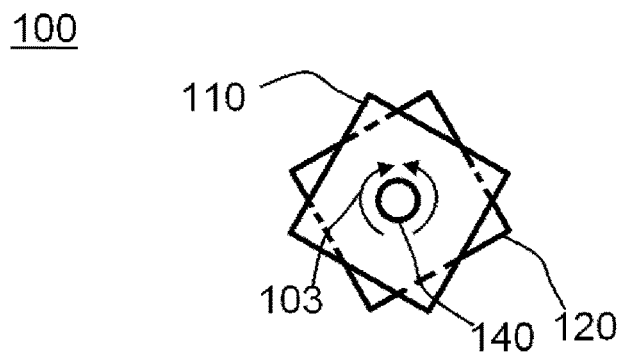
FIG. 1D: shows the connection module exposed to an external torque

FIG. 1D shows the connection module 100 under an external torque 103 in a view perpendicular to the longitudinal axis of the connecting element 140. Under the external torque 103 the connecting element 140 is arranged to twist elastically.

Any combination of load, moment and torque may also be applied to the connection module 100. The connecting element 140 is arranged to substantially behave elastically during said combined load, moment and torque. Furthermore, the connecting element 140 behaves resiliently in the sense that with no compressive or tensile force and/or torque applied in any direction relative to the connecting element 140, the connecting element 140 returns to a pre-determined state, preferably its original state.

The effect of strain on the connecting element 140 is not only dependent on the material it comprises, e.g. the Young's modulus of said material, but also on the geometry of the connecting element 140, and more specifically the second moment of area. If the location where the pontoon modules will be placed is known, a combination of materials and geometry of the connecting element 140 may be chosen using historical information on the body of water the pontoon modules will be floating on. Such information comprises data on e.g. weather conditions, earthquakes, wavelengths, wave heights, wave crests, wave troughs, any other known information on the body of water or any combination thereof.

In an embodiment of the connection module 100, at least one of the connecting element 140 and the coupling modules 110 has an average density below the density of the body of water on which they are arranged to float. This density is e.g. for fresh water $10^3$ kg/kg·m$^{-3}$, and for more saline water such as ocean or sea water between approximately $1.01·10^3$ kg·m$^{-3}$ and $1.04·10^3$ kg·m$^{-3}$ and more in particular between 1024 kg·m$^{-3}$ and 1028 kg·m$^{-3}$.

The lower density may be used to allow floatation of at least one of the connecting element 140 and the coupling modules 110, but may also aid in the floatation of the pontoon modules to which they are connected. In a further embodiment, a significant part of the floatation force or even the entire floatation force for the pontoon modules is provided by at least one of the connecting element 140 and the coupling modules 110.

In yet another embodiment of the connection module 100, the connecting element 140 is arranged to transport electrical energy. To arrange this transport, the connecting element 140 may comprises one or more conductive wires, wherein the wires comprise copper, aluminium, any other conducting material or any combination thereof. The electrical energy that is transported may originate from photovoltaic panels provided on the pontoon modules, but may also comprise a control signal, or a combination thereof.

The connecting element 140 may comprise a tube, through which electrical power wires may be provided. Such wires may be primarily arranged to transport electrical energy from the first pontoon module 510 to the second pontoon module 520. Alternatively or additionally, such tube or other hollow embodiment of the connecting element 140 may comprise electrical signal wires that are primarily arranged to provide communication of data between the first pontoon module 510 and the second pontoon module 520.

The tube is preferably flexible and as another separate option, the tube may be arranged to float while carrying a load like electrical wiring. Tubes having a certain flexibility are known from the dredging industry. For that industry, tubes having a certain flexibility and optionally, floating capabilities are available; such tubes may be used for technology described here as well. Alternatively or additionally, a reinforcing line, for example for safety and fall back scenarios, may be provided within the tube as well.

The coupling elements may be arranged as electrical connectors, to provide an electrical connection between the coupling elements and the receiving modules of the pontoon modules. In such an embodiment, the coupling element comprises a terminal corresponding to a terminal comprised by the receiving module. The terminals may be arranged as one or more pins and sockets. In a further embodiment, the terminals of two coupling elements of separate connection modules are arranged to connect and provide in an electrical connection between the separate connection modules.

Figure 2:
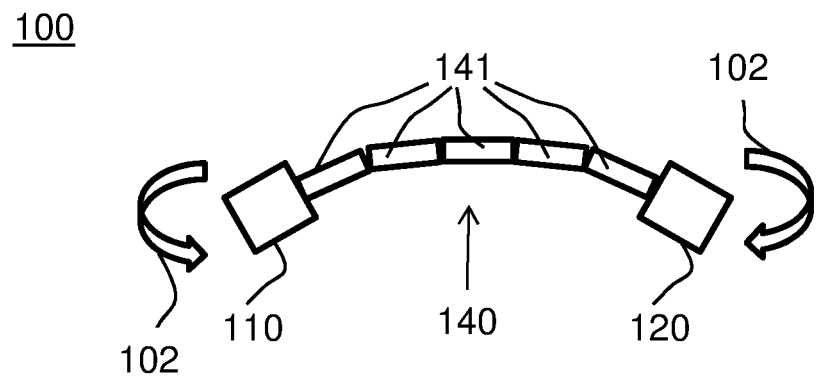
FIG. 2: shows the connection module comprising multiple elements

FIG. 2 shows the connection module 100, wherein in this embodiment the connecting element 140 is comprised out of multiple elements 141. In a first embodiment, all elements 141 comprise a resilient material, and in a second embodiment, the elements 141 alternately comprise a substantially rigid and a substantially resilient material.

In a further embodiment of the connection module 100 as shown in FIG. 2, the elements 141 are hingedly connected to one another. This hinged connection allows a rotation between two connected elements 141. The combination of all allowed rotations between all elements 141 allows the first pontoon module and the second pontoon module to rotate with respect to one another. The hinges may be provided with an urging element, arranged to urge the hinge into a specific angle, wherein said angle preferably is 180 degrees.

In a first embodiment, the hinges comprise at least two substantially rigid components that are arranged as a mechanical bearing, wherein the rigid components allow a certain degree of rotation between them. In a second embodiment, the hinges comprise a resilient material, preferably predominantly, wherein the straining of the resilient material allows the rotation, bending and torsion between two elements 141. This means the resilient mechanical part constitutes an omnidirectional hinge, without a specific axle. This allows the hinge to be manufactured in a plastic material like an elastomer—like synthetic or natural rubber—or a polyolefin. Such materials are less susceptible to corrosion and other ware in marine environments than iron or steel.

The second embodiment is particularly advantageous if the connecting elements 140 are provided as tubes or hoses that are flexible or relatively rigid. The tubes may at opposite ends provided with flanges. To the flanges, a flexible coupling member may be connected by means of flanges. Such flexible coupling member may be another tube or other hollow member having opposite ends surrounded by flanges and being more flexible than the tube constituting the connecting element. Flexibility or resilience may be defined as a force required for a particular deformation—like a particular curve radius. A higher resilience means that a higher force is required for obtaining a particular curve radius and a higher flexibility means a lower force is required.

The flanges may be used for connecting the tube at a first end of the flexible coupling member and one of to the first pontoon module 510 and the second pontoon module 520 at a second—opposite—end of the flexible coupling member. As such, the receiving module 511 may be provided as a pontoon flange having substantially the same diameter as coupling flange of the flexible coupling member, constituting the first connection module 531.

In another embodiment, the flexible coupling member is provided with the first pontoon module 510 and the not connected flange of the flexible coupling member constitutes the receiving module 511 and a flange of the tube constitutes the first connection module 531.

The flexible coupling members may be provided with reinforcing lines, parallel to the flexible tubes or hoses of the flexible coupling members.

It is noted that instead of flanges connected by means of screws, nuts and bolts, other means of connecting the hollow conduits that the flexible coupling members and tubes constitute. Such couplings may be existing quick-lock connections, other connections allowing mating, connecting and disconnecting faster and safer than with nuts and bolts, or novel connectors.

In a third embodiment, the hinges may be arranged as ball-and-socket joints, which allows at least some degree of rotation in all directions. In a fourth embodiment, the connecting element 140 comprising the elements 141 is arranged alike a spine, comprising hinging members (bones) and in between the hinging members elastic members (discs). The elastic members can be locally at least one of compressed, strained and rotated, thus allowing at least one of a translation and a rotation around any axis between two adjacent hinging members. This embodiment is comparable to the second embodiment.

Figure 3A:
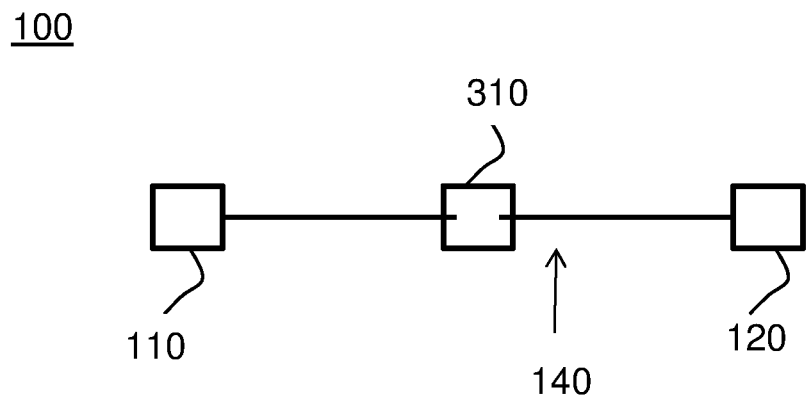
FIG. 3A: shows the connection module comprising a buffer
Figure 3B:
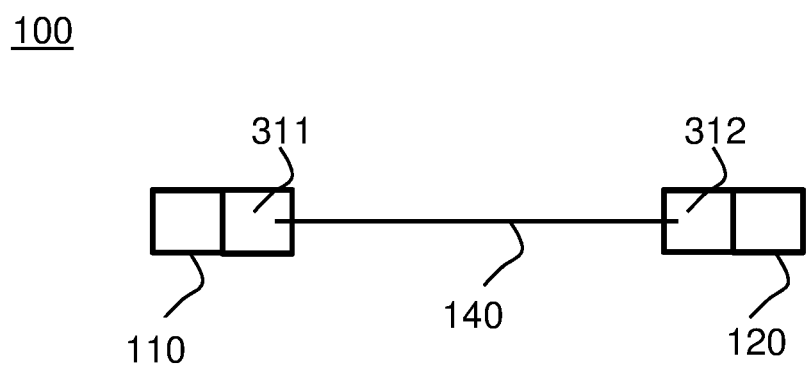
FIG. 3B: shows the connection module comprising multiple buffers

FIG. 3B shows an alternative embodiment of the connection module 100, wherein the connection module comprises two buffers, a first buffer 311 provided at the first side of the connection module 100 and a second buffer 312 provided at the second side of the connection module 100.

FIG. 3A shows the connection module 100, further comprises a buffer 310, arranged to store at least part of the connecting element 140. In the embodiment shown in FIG. 3A, the buffer 310 is provided between the first coupling element 120 and the second coupling element 120.

The buffers may be provided as a reel, on which at least part of the connecting element 140 can be reeled. In another embodiment, the buffer is provided as an empty space, arranged for receiving at least part of the connecting element 140. The buffer may also be arranged by allowing a first section of the connecting element 140 to slide in and out of a second section. For example, the first section may have a smaller cross-section than the second section and may therefor at least partially fit inside the second section. In a further embodiment, the buffer 310 may be the coupling element.

In any the embodiments of the connection module 100 wherein the connection module comprises one or more buffers, the buffers may comprise an urging element, arranged to urge the connecting element in the buffer. Furthermore, the buffers may comprise a damping element, arranged to provide damping on at least one of the inward or outward movement of the connecting element 140 inside the buffer 310.

Figure 4A:
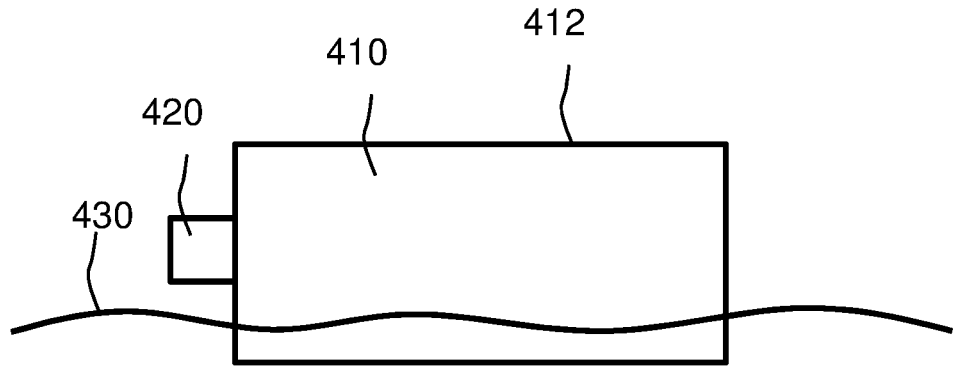
FIG. 4A: shows a pontoon module floating on a body of water

FIG. 4A shows a pontoon module 400, comprising a floating body 410, a work surface 412, and a receiving module 420. The floating body 410 is arranged to float on a body of water 430, and the receiving module 420 is arranged to receive a coupling module 110 of a connection module 100. The receiving module 420 may be placed anywhere on the pontoon module 400, e.g. on one of the sides, a corner, on the top or on the bottom.

Figure 4B:
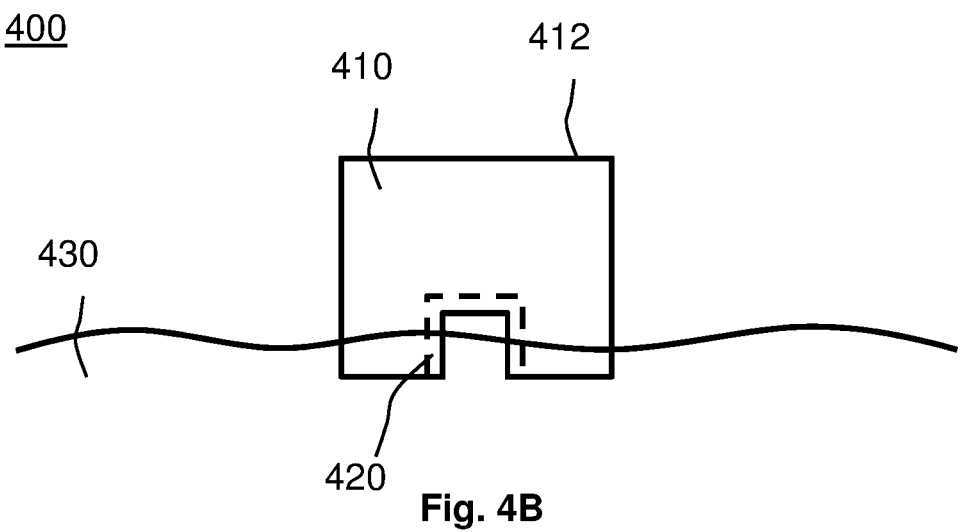
FIG. 4B: shows an alternative embodiment of the pontoon module

FIG. 4B shows in a side view a further embodiment of the pontoon module 400, wherein the receiving module 420 is arranged to be provided under water when the pontoon module 400 is floating on the body of water 430. The receiving module is provided as an elongated indentation in which a connection module or coupling module can be placed. Optionally, the ends of the indentation have a smaller cross-section than a middle section between the two ends. In such an embodiment, the ends of the indentation provide a clamp in which the connection module can be clamped. The indentation may in an alternative embodiment be provided at a top side of the pontoon module 400.

Figure 4C:
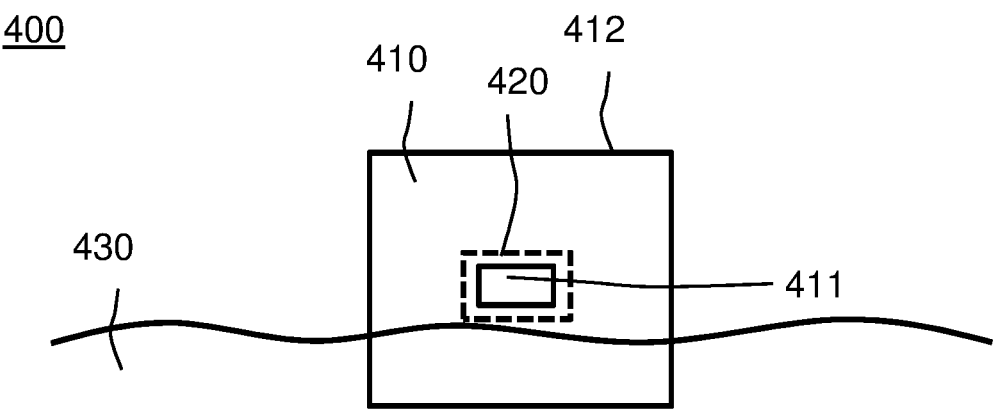
FIG. 4C: shows yet another embodiment of the pontoon module

In the side view of an embodiment of the pontoon module 400 as shown in FIG. 4C, the floating body 410 comprises hollow space 411, wherein the receiving module 420 is arranged. The ends of the hollow space 411 have, in a further embodiment, a smaller cross-section than a middle section between the two ends. In such an embodiment, the ends of the hollow space 411 provide a clamp in which the connection module can be clamped.

In any of the embodiment of the pontoon module 400, the pontoon module 400 may be provided with more than one receiving module 420. The position of these additional receiving modules may be any one of the abovementioned positions. Furthermore, the receiving module 420 may comprise a connection module 100 according to any of the abovementioned embodiments.

The work surface 412 may be provided with photovoltaic panels, arranged to convert solar energy to electrical energy. Converters, control circuitry, batteries, other components to collect, handle and store electrical energy generated by the photovoltaic panels or a combination thereof may be provided in the pontoon module 400.

Figure 5A:
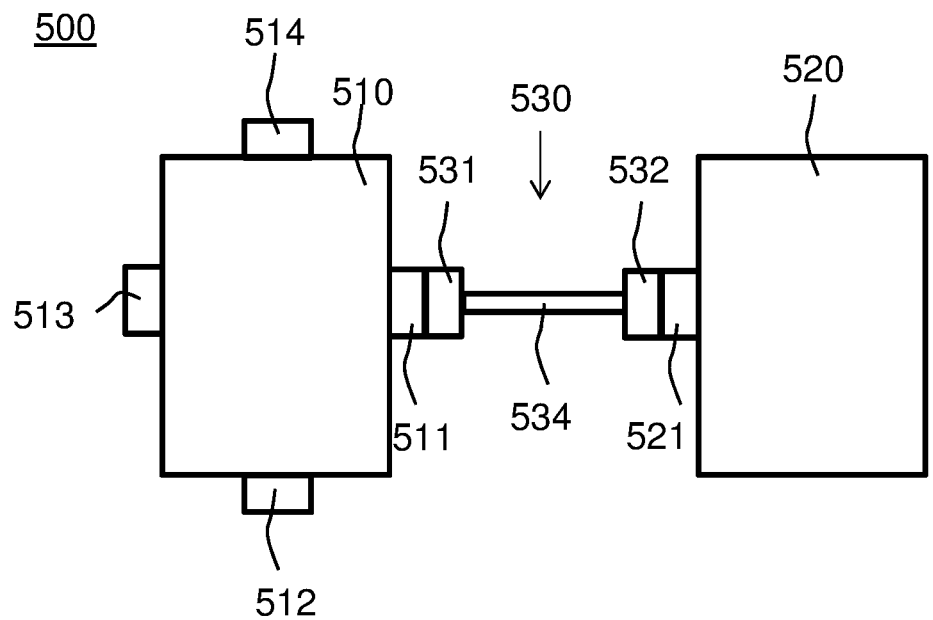
FIG. 5A: shows an embodiment of a network of pontoons

FIG. 5A shows part of a first embodiment of a network of pontoons 500, comprising a first pontoon module 510 and a second pontoon module 520. The first pontoon module 510 and the second pontoon module 520 are connected to each other with a first connection module 530. The first connection module 530 comprises at a first end a first connection module 531 which is connected to a first receiving module 511 comprised by the first pontoon module 510.

At a second end the first connection module 530 comprises a second connection module 532 which is connected to a second receiving module 521 comprised by the second pontoon module 520. In this arrangement, due to the fact that the first connection module 530 is arranged to change in length due to an external force the first pontoon module 510 and the second pontoon module 520 can translate with respect to each other. Additionally, due to the fact that the first connection module 530 is arranged to allow bending between the first side and the second side under influence of an external bending moment, the first pontoon module 510 and the second pontoon 520 can pitch, roll and yaw with respect to each other.

Additionally, due to the fact that the first connection module 530 is arranged to allow a rotation between the first side and the second side under influence of an external torque, the first pontoon module 510 and the second pontoon 520 can rotate relative to each other.

The embodiment of the network of pontoons 500 may be extended with any number of additional pontoon modules. In FIG. 5A, the first pontoon module 510 is therefor provided with a third receiving module 512, fourth receiving module 513, and fifth receiving module 514, all arranged to receive a connection module. Similarly, all other pontoon modules in the network of pontoon modules 500 may be provided with any number of additional receiving modules and any number of connection modules such that all pontoon modules in the network of pontoon modules 500 may be interconnected.

Figure 5B:
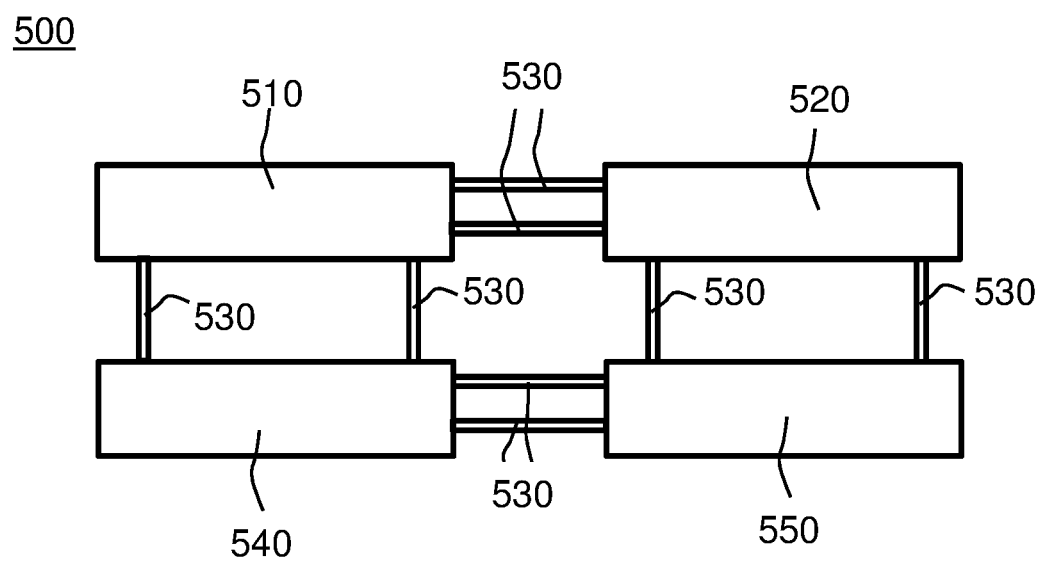
FIG. 5B: shows another embodiment of the network of pontoons

FIG. 5B shows an additional embodiment of the network of pontoons 500, comprising a first pontoon module 510, a second pontoon module 520, a third pontoon module 540, and a fourth pontoon module 550. To interconnect the pontoon modules, multiple connection modules 530 are used, wherein also multiple connection modules 530 are provided in-between two pontoon modules. An embodiment is also envisaged wherein in a first direction a different amount of connection modules 530 are used between two pontoon modules than in a second direction, wherein in FIG. 5B the first direction is perpendicular to the second direction. The network of pontoons 500 may be extended with any additional number of pontoon modules and connection modules 350.

Figure 5C:
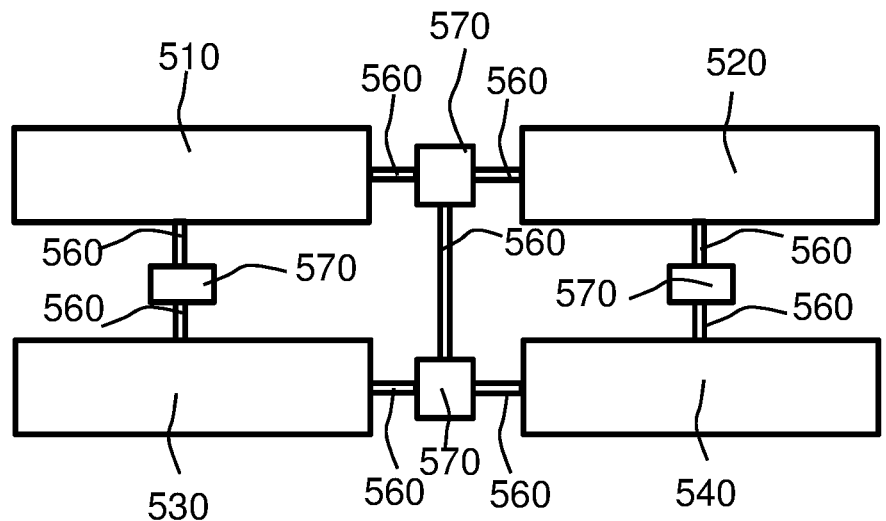
FIG. 5C: shows yet another embodiment of a network of pontoons

FIG. 5C shows yet another embodiment of the network of pontoons 500, comprising a first pontoon module 510, a second pontoon module 520, a third pontoon module 540, and a fourth pontoon module 550. Each pontoon module comprises one or more connecting elements 560. Provided between a set of connecting elements is a coupling module 570, arranged to provide a connection between two or more connecting elements 560.

This arrangement with coupling modules 570 arranged to interconnect connecting elements 560 comprised by multiple pontoon modules is envisioned with any number of pontoon modules and any number of connecting elements 560. In one embodiment, the coupling modules 570 are substantially single, monolithic elements. In another embodiment, the coupling modules 570 comprise coupling elements provided at each end of the connecting elements that together, in connected state, form the coupling module 570.

Figure 5D:
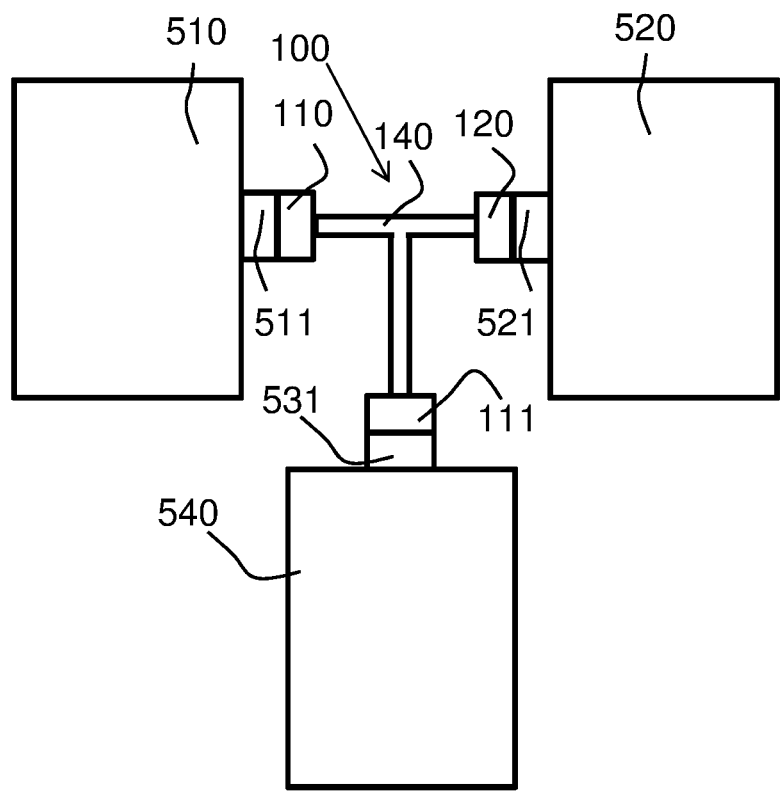
FIG. 5D: shows a connection module with more than two couplings modules

FIG. 5D shows the connection module 100, comprising a third coupling module 111 at a third end, wherein the third coupling module 111 is arranged to connect the connection module 100 to a receiving module 531 of a third pontoon module 540. Similar extensions of the connection module 100 with additional ends and coupling module are envisioned to connect any number of pontoon modules with any number of coupling modules.

Figure 5E:
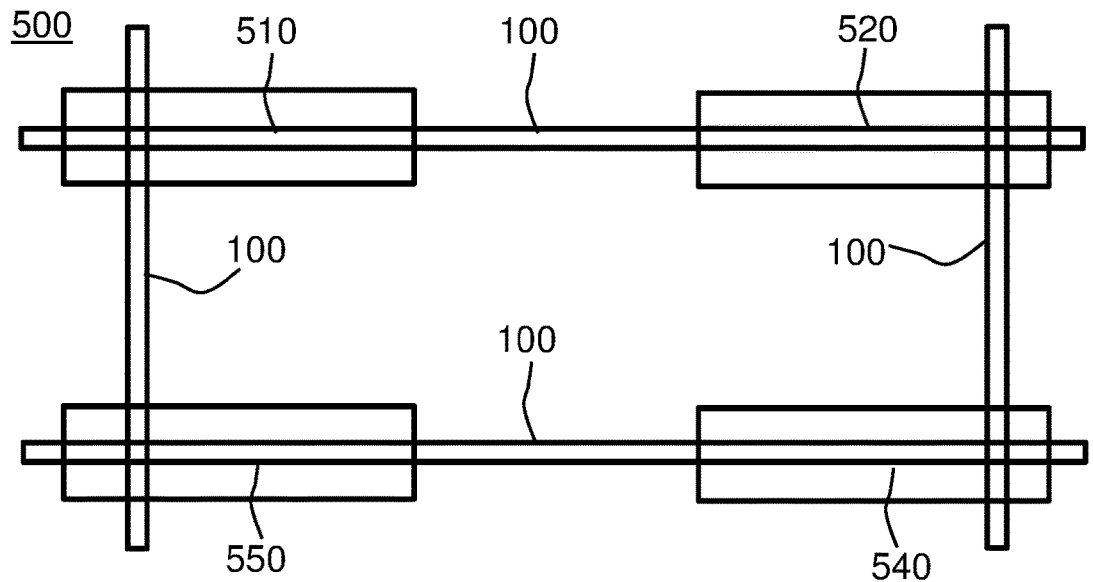
FIG. 5E: shows yet another embodiment of a network of pontoons

FIG. 5E shows an alternative embodiment of the network of pontoon modules 500, comprising the first pontoon module 510, the second pontoon module 520, the third pontoon module 540, and the fourth pontoon module 550. The pontoon modules are allowed to translate and rotate with respect to each other by means of the connection modules 100. The connection modules 100 are provided as continuous elements in the network 500 and may be provided going through each pontoon module, or at the top or the bottom of the pontoon modules, through indentations in the pontoon modules, or in any combination thereof.

The connection modules 100 that are provided substantially perpendicular to one another may be connected to one another at locations where they cross one another. Such connection may be substantially rigid, or alternatively, allow some movement of the connection modules 100 relative to one another and, alternatively or additionally, relative to the pontoon modules 500. In another embodiment, no connection is provided. In such embodiment, the connection modules 100 may be connected to one another by means of the pontoon modules 500. Rather than being provided in parallel to or perpendicular to the longitudinal direction of the pontoon modules 500, the connection modules 100 may also be provided under an angle relative to the longitudinal direction of the pontoon modules 500. Such angle may be between 60° and 30°, between 40° and 50° and preferably about 45°.

Figure 5F:
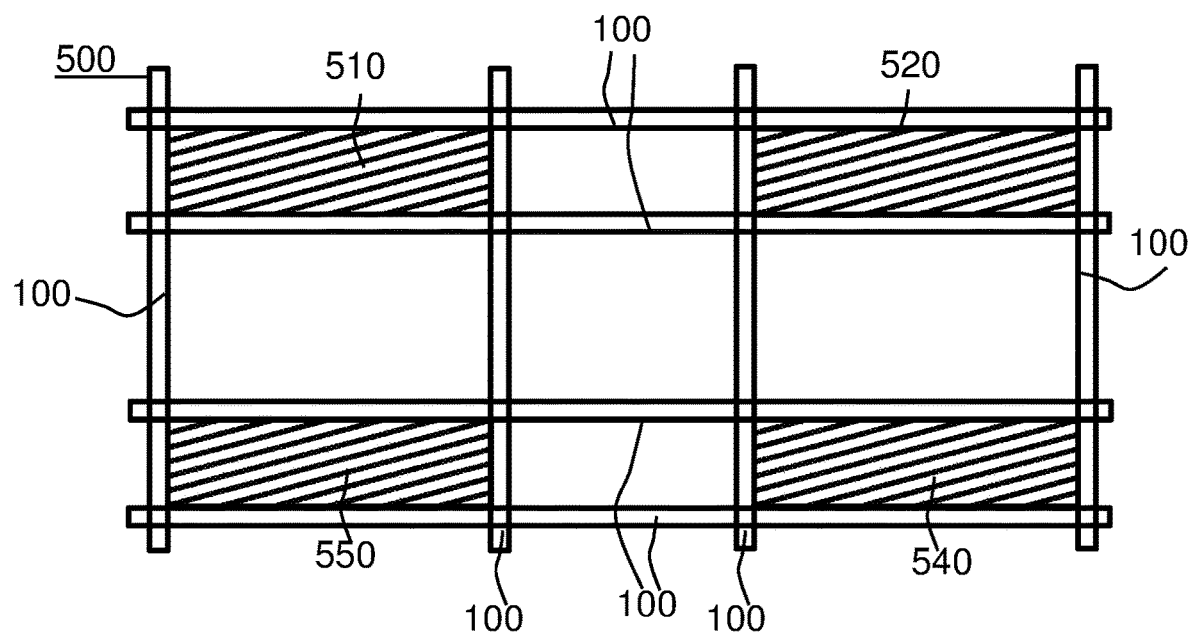
FIG. 5F: shows yet another embodiment of a network of pontoons

FIG. 5F shows yet another alternative embodiment of the network of pontoon modules 500, comprising the first pontoon module 510, the second pontoon module 520, the third pontoon module 540, and the fourth pontoon module 550, which for clarity have been provided with a crosshatch in FIG. 5F. In this embodiment of the network of pontoon modules 500, the connection modules 100 are provided as continuous elements alongside the pontoon modules. The connection modules 100 may be attached at a side of the pontoon modules, optionally through indentations comprised by the pontoon modules.

Figure 5G:
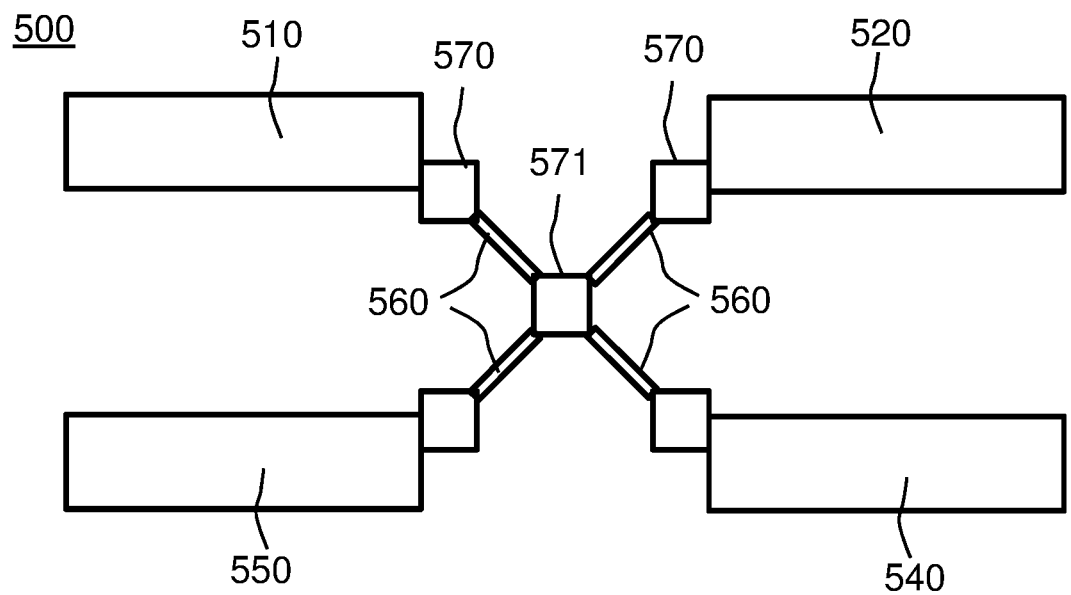
FIG. 5G: shows yet another embodiment of a network of pontoons

FIG. 5G shows yet another embodiment of the network of pontoon modules 500, comprising the first pontoon module 510, the second pontoon module 520, the third pontoon module 540, and the fourth pontoon module 550. Each pontoon module comprises one or more coupling modules 570. The network of pontoon modules 500 further comprises an additional coupling module 571, provided in-between the pontoon modules. In-between the additional coupling module 571 and the coupling modules 570 comprised by the pontoon modules 510, 520, 540 550 connecting elements 560 are provided. With this arrangement of coupling modules 570, connecting elements 560, and additional coupling module 571, the pontoon modules can translate and rotate relative to each other. Any number of connecting elements 560 may be connected to additional coupling module 571, as such to connect any number of pontoon modules.

The shape of the pontoon modules, regarded from a top view, may be substantially rectangular, but also substantially resembling a triangle, pentagon, octagon or any other shape. A different shape of the pontoon modules allows different shapes of networks of pontoons, wherein different amounts of connection modules may be provided between pontoon modules in different directions.

The connection between any two of receiving module, connection module and coupling module may be a permanent or a temporary connection. E.g., a permanent connection may be made by welding, gluing, any other method of permanent connection or any combination thereof. A temporary connection may e.g. comprise magnets or electromagnets, clamps, wedges, hooks, bolts, nuts, screws, rivets, flanges, any other temporary connection element or any combination thereof.

When the pontoon modules comprised by the network of pontoons 500 are provided with photovoltaic panels, and the connection modules are arranged to transport electrical energy, the network of pontoons 500 may be arranged as a power plant. Optionally provided with the network of pontoons 500 are storage means for electrical energy, e.g. a battery, and a means of transporting energy to an electricity grid provided on land.

The pontoon modules may also be used to suspend fish farm cages, mussel farming equipment or other forms of aquaculture underneath each pontoon. This may be combined with providing solar panels at the work surface 412 of the pontoons.

The modular build-up of the network of pontoons 500 has the advantage that relatively small components such as the pontoon modules and the connecting elements can be made in a factory and then easily shipped to a construction site near the location where the network of pontoons 500 will be deployed.

Optionally, the network of pontoons 500 may be provided with at least one of an anchor or a drive unit to maintain the position of the network of pontoons 500 on the body of water.

At least some of the various aspects and embodiments thereof discussed above may be summarised by means of the following numbered embodiments:

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A connection module, arranged for connecting multiple pontoon modules, the connection module comprising:
    at a first end, a first coupling module, arranged to connect the connection module at the first end to a receiving module of a first pontoon module;
    at a second end, a second coupling module, arranged to couple the connection module at the second end with a receiving module of a second pontoon module; and
    a connecting element, provided between the first end and the second end of the connection module;
    wherein the connecting element is arranged to provide a connection between the first pontoon module and the second pontoon module and wherein the connecting element is arranged with at least one of the following specifics:
    change in length under the influence of an external force on the connection module;
    allow a rotation under the influence of an external torque between the first coupling module and the second coupling module; and
    allow a bending under the influence of an external load or bending moment between the first coupling module and the second coupling module.

2. The connection module according to claim 1, wherein the connecting element comprises a substantially resilient material, arranged to resiliently change in length under the influence of the external force, arranged to resiliently bend under the external bending moment, and arranged to resiliently rotate under and external torque.

3. The connection module according to claim 1, wherein the connecting element comprises a substantially rigid material.

4. The connection module according to claim 1, wherein the connecting element, in the longitudinal direction of the connecting element, comprises intermittently the substantially resilient material and the substantially rigid material.

5. The connection module according to claim 1, comprising an elongate element having a first resilience and a first end element at a first end of the elongate element and a second end element at a second end of the elongate element opposite to the first end, the end elements having a second resilience being lower than the first resilience.

6. The connection module according to claim 5, wherein the end elements comprise at least one of a plastic, organic polymer or elastomer.

7. The connection module according to claim 6, not comprising mechanically hinged rigid parts.

8. The connection module according to claim 1, comprising multiple elements arranged to hinge relative to one another.

9. The connection module according to claim 1, wherein the connection module comprises a buffer, wherein the buffer is arranged to store at least part of the connecting element.

10. The connection module according to claim 1, wherein the connection module is arranged to transport electrical energy.

11. The connection module according to claim 1, wherein the connection module has an average density of less than 1028 kg·m$^{-3}$.

12. The connection module according to claim 1, wherein the connecting element is arranged to return to a pre-determined shape if no force, torque or bending moment is applied to the connecting element.

13. A pontoon module, arranged to provide a floating working surface, comprising:
    a floating body, arranged to float on a water body; and
    a receiving module, arranged to receive a coupling module of a connection module comprising:
        at a first end, a first coupling module, arranged to connect the connection module at the first end to a receiving module of a first pontoon module;
        at a second end, a second coupling module, arranged to couple the connection module at the second end with a receiving module of a second pontoon module; and
        a connecting element, provided between the first end and the second end of the connection module;
    wherein the connecting element is arranged to provide a connection between the first pontoon module and the second pontoon module and wherein the connecting element is arranged with at least one of the following specifics:
        change in length under the influence of an external force on the connection module;
        allow a rotation under the influence of an external torque between the first coupling module and the second coupling module; and
        allow a bending under the influence of an external load or bending moment between the first coupling module and the second coupling module.

14. The pontoon module according to claim 13, wherein the receiving module is provided at a bottom side of the floating body, wherein the bottom side is arranged to be situated under the waterline when the pontoon module is provided on the water body.

15. The pontoon module according to claim 13, wherein the floating body comprises a hollow space and the receiving module is provided in the hollow space of the floating body.

16. The pontoon module according to claim 13, wherein the receiving module is at least partly resilient and arranged with at least one of the following specifics:
   change in length under the influence of an external force on the connection module;
   allow a rotation under the influence of an external torque between the first coupling module and the second coupling module; and
   allow a bending under the influence of an external load or bending moment between the first coupling module and the second coupling module;
   wherein the resilience of the receiving module of the pontoon module is lower than the resilience of the connecting element.

17. A network of pontoon modules, comprising:
   a first pontoon module arranged to provide a floating working surface, comprising:
      a first floating body, arranged to float on a water body; and
      a first receiving module, arranged to receive a coupling module of a connection module;
   a second pontoon module provided adjacently to the first pontoon module, comprising:
      a second floating body, arranged to float on the water body; and
      a second receiving module, arranged to receive a coupling module of a connection module;
   a first connection module connected to the first receiving module of the first pontoon module, and a second coupling module connected to the second receiving module of the second pontoon module, wherein the first connection module comprises:
      at a first end, a first coupling module, arranged to connect the connection module at the first end to a receiving module of a first pontoon module;
      at a second end, a second coupling module, arranged to couple the connection module at the second end with a receiving module of a second pontoon module; and
      a connecting element, provided between the first end and the second end of the connection module;
   wherein the connecting element is arranged to provide a connection between the first pontoon module and the second pontoon module and wherein the connecting element is arranged with at least one of the following specifics:
      change in length under the influence of an external force on the connection module;
      allow a rotation under the influence of an external torque between the first coupling module and the second coupling module; and
      allow a bending under the influence of an external load or bending moment between the first coupling module and the second coupling module.

18. The network of pontoon modules according to claim 17, wherein the pontoon modules comprise one or more photovoltaic installations.

19. The connection module according to claim 11, wherein the connecting element is arranged to allow all of:
   change in length under the influence of an external force on the connection module;
   allow a rotation under the influence of an external torque between the first coupling module and the second coupling module; and
   allow a bending under the influence of an external load or bending moment between the first coupling module and the second coupling module.

20. The connection module according to claim 11, wherein the connection module has an average density of less than 1000 kg·m$^{-3}$.

* * * * *